(12) United States Patent
Jin et al.

(10) Patent No.: US 10,158,812 B2
(45) Date of Patent: Dec. 18, 2018

(54) ELECTRONIC DEVICE AND OPERATION METHOD THEREFOR

(71) Applicant: Samsung Electronics Co., Ltd., Gyeonggi-do (KR)

(72) Inventors: Sung-Ki Jin, Gyeonggi-do (KR); Ilkwon Park, Gyeonggi-do (KR); Hyeong-Chan Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 36 days.

(21) Appl. No.: 15/393,816

(22) Filed: Dec. 29, 2016

(65) Prior Publication Data

US 2017/0195594 A1 Jul. 6, 2017

(30) Foreign Application Priority Data

Jan. 6, 2016 (KR) ........................ 10-2016-0001593

(51) Int. Cl.
*H04N 5/357* (2011.01)
*H04N 5/232* (2006.01)
*H04N 5/361* (2011.01)

(52) U.S. Cl.
CPC ....... *H04N 5/3572* (2013.01); *H04N 5/23229* (2013.01); *H04N 5/361* (2013.01)

(58) Field of Classification Search
CPC ....... H04N 5/3572; H04N 5/361; H04N 5/357
See application file for complete search history.

(56) References Cited

U.S. PATENT DOCUMENTS

| | | | | |
|---|---|---|---|---|
| 3,651,248 | A * | 3/1972 | Schneider | H04N 9/09 348/692 |
| 6,724,423 | B1 * | 4/2004 | Sudo | H04N 5/232 348/188 |
| 9,749,559 | B2 * | 8/2017 | Tanaka | H04N 5/361 |
| 2001/0005226 | A1 * | 6/2001 | Muramatsu | H04N 5/361 348/304 |
| 2004/0169750 | A1 * | 9/2004 | Miyahara | H04N 5/3595 348/294 |
| 2005/0007475 | A1 * | 1/2005 | Hori | H04N 5/3653 348/321 |
| 2005/0093991 | A1 * | 5/2005 | Yokohata | H04N 5/361 348/222.1 |
| 2007/0085919 | A1 * | 4/2007 | Sato | H04N 5/3595 348/302 |
| 2007/0188641 | A1 * | 8/2007 | Jang | H04N 5/3598 348/308 |
| 2008/0192130 | A1 * | 8/2008 | Noh | H04N 5/361 348/243 |
| 2008/0197268 | A1 * | 8/2008 | Kameda | H01L 27/14623 250/208.1 |

(Continued)

FOREIGN PATENT DOCUMENTS

JP 2013214952 10/2013

*Primary Examiner* — Timothy J Henn
(74) *Attorney, Agent, or Firm* — The Farrell Law Firm, P.C.

(57) ABSTRACT

Disclosed is a method of an electronic device, including acquiring image data from a plurality of image sensors including optical black (OB) areas that are light-shielding areas for providing a constant reference signal, correcting an OB deviation between data acquired from the OB areas, for at least one piece of the image data, and outputting, to an image processing unit, the image data for which the OB deviation is corrected.

16 Claims, 10 Drawing Sheets

(56) References Cited

U.S. PATENT DOCUMENTS

| | | | |
|---|---|---|---|
| 2009/0122167 A1* | 5/2009 | Noh | H04N 5/361 |
| | | | 348/243 |
| 2010/0110223 A1* | 5/2010 | Kobayashi | H04N 5/361 |
| | | | 348/223.1 |
| 2013/0235149 A1 | 9/2013 | Tanaka et al. | |
| 2015/0078725 A1* | 3/2015 | Kobuse | G11B 20/00007 |
| | | | 386/224 |
| 2015/0116533 A1* | 4/2015 | Hsu | H04N 5/361 |
| | | | 348/223.1 |
| 2017/0180681 A1* | 6/2017 | Okita | H04N 9/045 |
| 2017/0195594 A1* | 7/2017 | Jin | H04N 5/3572 |
| 2017/0251911 A1* | 9/2017 | Ito | A61B 1/00193 |

* cited by examiner

ELECTRONIC DEVICE AND OPERATION METHOD THEREFOR

PRIORITY

This application claims priority under 35 U.S.C. § 119(a) to a Korean Patent Application which was filed in the Korean Intellectual Property Office on Jan. 6, 2016 and assigned Serial No. 10-2016-0001593, the contents of which are incorporated herein by reference.

BACKGROUND

1. Field of the Disclosure

The present disclosure relates generally to an electronic device and a method therefor.

2. Description of the Related Art

Due to advances in technology, an electronic device now includes a variety of functionalities and performs complex functions. For example, an electronic device may have a camera unit through which it may photograph image data. Such a camera unit may include a plurality of image sensors to photograph image data that may be processed by an image signal processor.

However, when such an electronic device acquires image data from a plurality of image sensors, there may occur an optical black (OB) deviation that is a physical characteristic between each of the image sensors. The OB deviation physically generated between pixels within an image sensor requires correction, and the design change of an image signal processor may also be required.

Alternatively, OB deviation may be corrected by providing as many storage units (for example, a frame buffer) as the number of the image sensors, but the hardware configuration is enlarged in the process. To reduce the hardware configuration, image data of other image sensors may be collectively corrected with reference to an OB value calculated in one image sensor, or image data of a plurality of image sensors may be corrected using an average OB value. However, this process decreases the efficiency of image data processing and the reliability of the processed data.

As such, there is a need in the art for a device that corrects OB deviation without increasing size and sacrificing efficiency.

SUMMARY

An aspect of the present disclosure is to address at least the above-mentioned problems and/or disadvantages and to provide at least the advantages described below.

According to an aspect of the present disclosure, a method of an electronic device includes acquiring image data from a plurality of image sensors including OB areas that are light-shielding areas for providing a constant reference signal, correcting an OB deviation between data acquired from the OB area, for at least one piece of the image data, and outputting, to an image processing unit, the image data for which the OB deviation is corrected.

According to another aspect of the present disclosure, an electronic device includes a plurality of image sensors configured to include OB areas that are light-shielding areas for providing a constant reference signal, and acquire image data, a correction unit configured to correct an OB deviation between data acquired from the OB areas, for at least one piece of the image data, an image processing unit configured to receive data for which the OB deviation is corrected, and a control unit functionally connected with and controlling the image sensors, the correction unit, and the image processing unit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
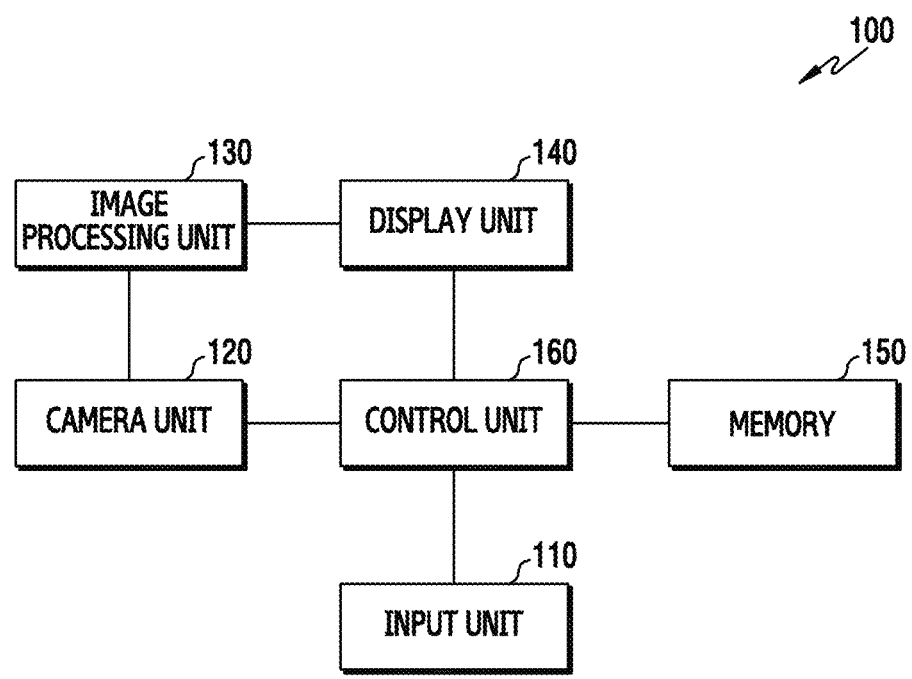
FIG. 1 illustrates a block diagram of an electronic device according to embodiments of the present disclosure.

Embodiments of the present disclosure are described below with reference to the accompanying drawings. However, the embodiments are not intended to limit the technology mentioned in the present disclosure to a specific form, and should be understood to include various modifications, equivalents and/or alternatives of the embodiments of the present disclosure. In relation to a description of the drawing, like reference symbols can denote like constituent elements.

In the present disclosure, expressions such as "have", "can have", "comprise", and "may comprise" indicate the existence of a corresponding feature, such as a numeric value, a function, an operation, or a constituent element such as a component, and do not exclude the existence of an additional feature.

In the present disclosure, the expressions "A or B", "at least one of A or/and B", "one or more of A or/and B", etc. can include all available combinations of items enumerated together. For example, "A or B", "at least one of A and B", or "at least one of A or B" can denote all of the cases of (1) including at least one A, (2) including at least one B, or (3) including all of at least one A and at least one B.

The expressions "1st", "2nd", "first", "second", etc. used in the present disclosure can modify various constituent elements irrespective of order and/or importance, and are just used to distinguish one constituent element from another constituent element and do not limit the corresponding constituent elements. For example, a first user device and a second user device can represent different user devices regardless of order or importance. For example, a first constituent element can be referred to as a second constituent element without departing from the scope of right mentioned in the present disclosure and similarly, the second constituent element can be referred to as the first constituent element.

When it is mentioned that any constituent element, such as a first constituent element, is "(operatively or communicatively) coupled with/to" or is "connected to" another constituent element, such as a second constituent element, it is to be understood that the first constituent element can be directly coupled to the second constituent element, or be coupled to the second constituent element through a further constituent element, such as a third constituent element. However, when it is mentioned that the first constituent element is "directly coupled" or is "directly connected" to the second constituent element, it can be understood that the third constituent element does not exist between the first and second constituent elements.

The expression "configured (or set) to" used in the present disclosure can be used interchangeably with, for example, "suitable for", "having the capacity to", "designed to", "adapted to", "made to", or "capable of", based on the situation. The expression "configured (or set) to" may not necessarily indicate only "specifically designed to" in hardware. Instead, in any situation, the expression "device configured to" can represent that the device is "capable of" together with other devices or components. For example, the phrase "processor configured (or set) to perform A, B, and C" can represent an embedded processor for performing a corresponding operation, or a generic-purpose processor, such as a central processing unit (CPU) or an application processor (AP) capable of performing corresponding operations by executing one or more software programs stored in a memory device.

The terms in the present disclosure are used to describe specific embodiments, and are not intended to limit the scope of additional embodiments of the present disclosure. For example, the expression of a singular form can include the expression of a plural form unless the disclosure or corresponding description clearly dictates otherwise.

The terms used herein inclusive of technological or scientific terms can have the same meaning as those commonly understood by a person having ordinary knowledge in the art mentioned in the present disclosure. Among the terms used in the present disclosure, the terms defined in a general dictionary can be interpreted as the same or similar meanings as the contextual meanings of a related technology, and are not to be interpreted as having ideal or excessively formal meanings unless defined clearly in the present disclosure. In some instances, even the term defined in the present disclosure cannot be interpreted to exclude embodiments of the present disclosure.

An electronic device according to embodiments of the present disclosure can include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical instrument, a camera, or a wearable device.

According to embodiments, the wearable device can include at least one of an accessory type, such as a watch, a ring, a wristlet, an anklet, a necklace, glasses, a contact lens, or a head-mounted-device (HMD), a fabric or clothing integrated type, such as electronic clothes, a body mount type, such as a skin pad or tattoo, or a bio implantation type, such as an implantable circuit.

In some embodiments, the electronic device can be a home appliance including at least one of a television (TV), a digital video disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync®, Apple TV®, or Google TV®), a game console, such as Xbox®, PlayStation®, an electronic dictionary, an electronic locking system, a camcorder, or an electronic frame.

In another embodiment, the electronic device can include at least one of various medical instruments, such as a blood sugar, heartbeat, blood pressure, or body temperature measurement instrument, magnetic resonance angiography (MRA), magnetic resonance imaging (MRI), computerized tomography (CT), a photographing machine, an ultrasonic machine, a navigation device, a global navigation satellite system (GNSS), an event data recorder (EDR), a flight data recorder (FDR), a car infotainment device, electronic equipment for a ship, such as a navigation device or, a gyrocompass, avionics, a security instrument, a head unit for a car, an industrial or home robot, an automated teller machine (ATM), a point of sales (POS) device, or an Internet of things (IoT) device, such as an electric light bulb, various sensors, an electricity or gas meter, a sprinkler device, a fire alarm, a thermostat, a streetlight, a toaster, an exercise device, a hot water tank, a heater, or a boiler.

According to embodiments of the present disclosure, the electronic device can include at least one of a part of furniture or building/structure, an electronic board, an electronic signature receiving device, a projector, or various metering instruments, such as tap water, electricity, gas, or a radio wave metering instrument. The electronic device can be a combination of one or more of the aforementioned devices, and can be a flexible electronic device. The electronic device according to embodiments of the present disclosure is not limited to the aforementioned instruments, and can include a new electronic device according to the development of technology.

In the present disclosure, the term 'user' can denote a person who uses the electronic device or an artificial intelligence electronic device which uses the electronic device.

FIG. 1 illustrates a block diagram of an electronic device according to embodiments of the present disclosure.

Referring to FIG. 1, an electronic device 100 may include an input unit 110, a camera unit 120, an image processing unit 130, a display unit 140, a memory 150, and a control unit 160.

The input unit 110 may generate input data in the electronic device 100, such as in response to a user input of the electronic device 100, and thus may include at least one input means such as a key pad, a dome switch, a physical button, a touch panel, a jog & shuttle, and a sensor.

The camera unit 120 may photograph image data in the electronic device 100, and may have an image sensor and a signal processing unit. The image sensor may convert an optical signal to an electrical image signal. The signal processing unit may be integrally or separately implemented with the image sensor and may convert an analog image signal to digital image data. For example, the image sensor may include a charge-coupled device (CCD) sensor and a complementary metal oxide semiconductor (CMOS) sensor, and the signal processing unit may include a digital signal processor (DSP).

According to embodiments, the camera unit 120 may have a dual camera structure to acquire image data. To this end, the camera unit 120 may have a plurality of image sensors. That is, each of the plurality of image sensors may acquire image data in response to one subject, and may include an OB area that is a light-shielding area for providing a constant reference signal. Each of the plurality of image sensors may acquire OB data through the OB area.

The camera unit 120 may correct an offset difference that is a physical characteristic between each of the image sensors through the OB data.

The image processing unit 130 may process image data into display data in the electronic device 100. For example, the image processing unit 130 may be an image signal processor, may process image data in units of frames such that the same corresponds to the property and size of the display unit 140, and may have an image codec to compress image data or decompress the compressed image data. For example, the image codec may include a joint photographic experts group (JPEG) codec, an MPEG4 codec, and a wavelet codec.

The display unit 140 may output the display data in the electronic device 100. The display data may indicate information processed in the electronic device 100. For example, the display unit 140 may include at least one of a liquid crystal display (LCD), a light emitting diode (LED) display, an organic LED (OLED) display, a micro electro mechanical system (MEMS) display, and an electronic paper display. The display unit 140 may be implemented as a touch screen while being coupled to the input unit 110.

The memory 150 may store operation programs of the electronic device 100, programs for processing the image data acquired from the camera unit 120, and data generated while the programs are being performed. According to embodiments, the memory 150 may store an image compression file or the image data acquired from the camera unit 120.

The control unit 160 may control an overall operation of the electronic device 100, and thus may be functionally connected to elements of the electronic device 100 so as to control the elements of the electronic device 100. The control unit 160 may receive a command or data from the elements of the electronic device 100, and process the command or data. Accordingly, the control unit 160 may perform a variety of functions. For example, the control unit 160 may include a function processing unit, such as an application processor (AP), for each function. According to embodiments, the control unit 160 may process the image data acquired from the camera unit 120.

Figure 2:
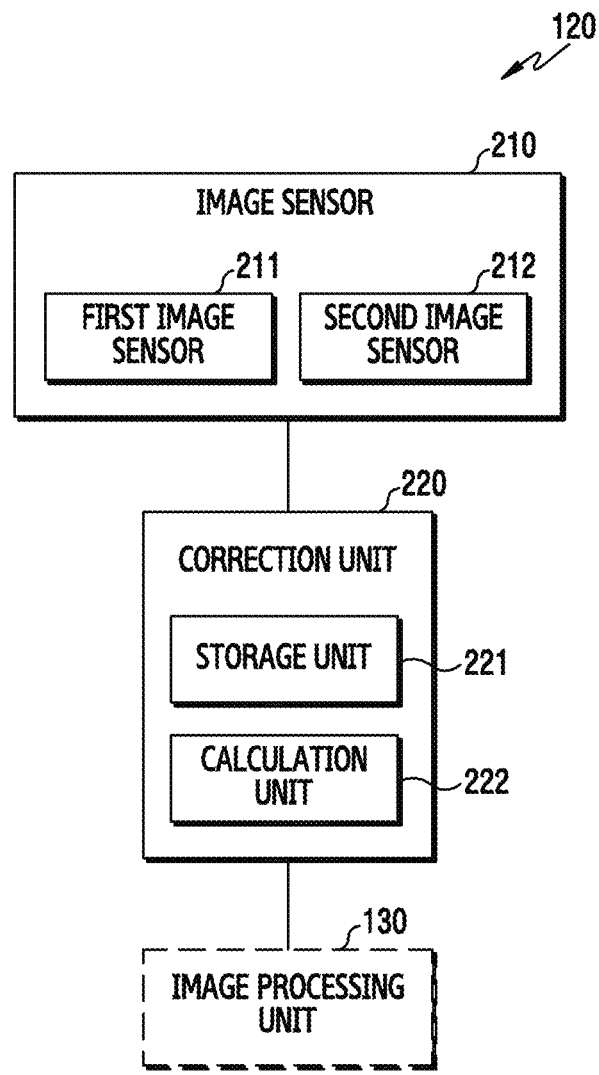
FIG. 2 illustrates a block diagram of the camera unit in FIG. 1.
Figure 3:
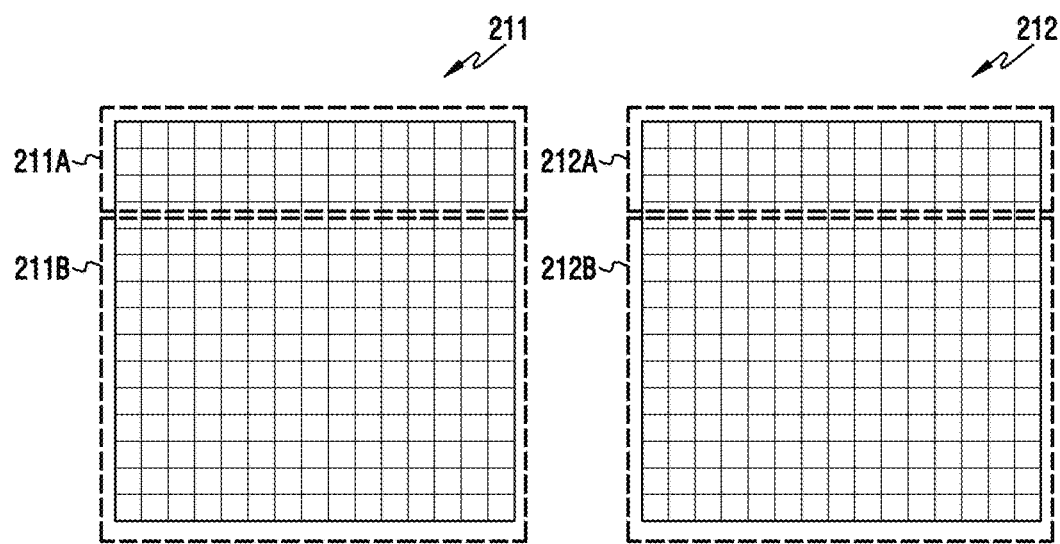
FIG. 3 illustrates the image sensors in FIG. 2.
Figure 4:
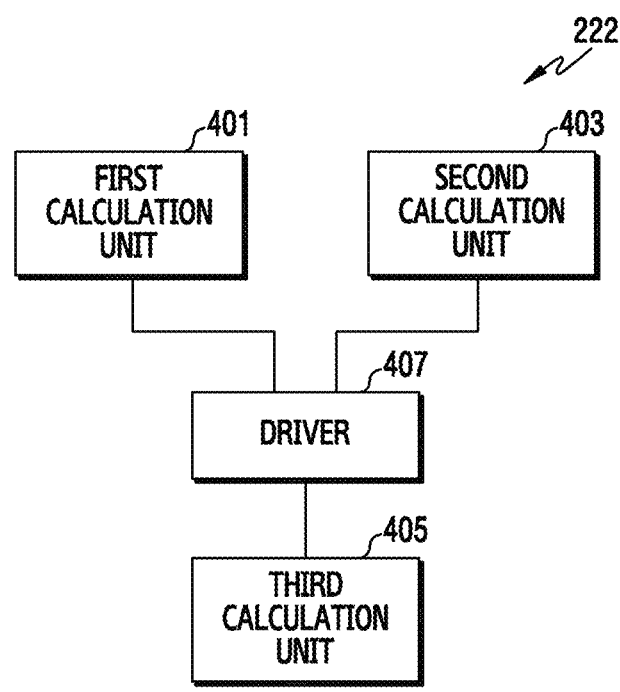
FIG. 4 illustrates the calculation unit in FIG. 2.

FIG. 2 illustrates a block diagram of the camera unit in FIG. 1. FIG. 3 illustrates the image sensors in FIG. 2. FIG. 4 illustrates the calculation unit in FIG. 2.

Referring to FIG. 2, the camera unit 120 may include image sensors 210 and a correction unit 220. It is described, in FIG. 1, that the image processing unit 130 is separated from the camera unit 120. However, embodiments are not limited thereto, and the image processing unit 130 may be integrally implemented within the camera unit 120.

The camera unit 120 may include a plurality of image sensors 210 in order to acquire the image data through the plurality of image sensors 210, respectively. For example, as illustrated in FIG. 2, the image sensors 210 may include a first image sensor 211 and a second image sensor 211. FIG. 2 illustrates that the image sensors 210 include two image sensors, but embodiments are not limited thereto. Therefore, the image sensors 210 may include three or more image sensors.

The camera unit 120 may acquire first image data from the first image sensor 211, and acquire second image data from the second image sensor 212. For example, the first image data and the second image data may be asymmetric to each other, in which case a first attribute parameter of the first image data and a second attribute parameter of the second image data may be different. The first image data and the second image data may also be symmetric to each other, in which case a first attribute parameter of the first image data and a second attribute parameter of the second image data may be identical.

The first image sensor 211 may include, for example, a pixel array, a row decoder or an analog-digital converter (ADC).

Referring to FIG. 3, the pixel array of the first image sensor 211 may include a plurality of pixels, such as one or more micro-lenses, color filters, and photodiodes, and may include a first active area 211B and a first OB area 211A.

A plurality of pixels may be disposed in the first active area 211B. First active data obtained from the plurality of pixels may be acquired in the first active area 211B. The first OB area 211A may be disposed at the edge of the pixel array of the first image sensor 211, and may be formed adjacent to the first active area 211B. For example, the first OB area 211A may be formed at the upper end of the first active area 211B. Light-shielded pixels may be disposed in the first OB area 211A. The light-shielded pixels have generally the same configuration as that of the pixels disposed in the first active area 211B, but may also have a light-shielding film that is formed on the photodiodes and is made of metal or polysilicon, such that light is not incident on the photodiodes. First OB data obtained from the light-shielded pixels may be acquired in the first OB area 211A. The first OB area 211A may provide a constant reference signal regardless of the incident light, and functions to prevent the signal level of an image signal from fluctuating according to the temperature change. That is, in a normal operation, it is regarded that the voltage level of the reference signal is generated by the ambient temperature, so that the difference in the voltage levels between the image signal and the reference signal may be calculated using a signal generated by the incident light. Therefore, a more accurate image signal may be generated through the image processing unit 130 at a later time.

The row decoder may apply, to the pixel array, driving signals such as a selection signal, a reset signal, and a transmission signal through row signal lines so as to select line pixels of the pixel array. The pixel array may provide, through a plurality of output lines to the ADC, pixel signals that are electrical signals sensed by respective pixels in response to the driving signals of the row decoder.

The ADC may convert the pixel signals provided from the pixel array into digital signals. The first image sensor 211 may convert the amount of light acquired from the pixel array into pixel data through the ADC. The pixel data may be output through the correction unit 220 including image pipelines, and may be transmitted to the outside through an interface such as a mobile industry processor interface (MIPI), in the correction unit 220.

The second image sensor 212 may include, for example, a pixel array, a row decoder, and an ADC.

The pixel array of the second image sensor 212 may include a plurality of pixels, such as one or more micro-lenses, color filters, and photodiodes, and may include a second active area 212B and a second OB area 212A.

A plurality of pixels may be disposed in the second active area 212B. Second active data obtained from the plurality of pixels may be acquired in the second active area 212B.

The second OB area 212A may be disposed at the edge of the pixel array of the second image sensor 212, and may be formed adjacent to the second active area 212B, such as at the upper end of the second active area 212B. Light-shielded pixels may be disposed in the second OB area 212A, and have generally the same configuration as that of the pixels disposed in the second active area 212B, but may also have a light-shielding film that is formed on the photodiodes and is made of metal or polysilicon, such that light is not incident on the photodiodes. Second OB data obtained from the light-shielded pixels may be acquired in the second OB area 212A.

The second OB area 212A may provide a constant reference signal regardless of the incident light, and functions to prevent the signal level of an image signal from fluctuating according to the temperature change. That is, in a normal operation, the voltage level of the reference signal is generated by the ambient temperature, so that the difference in the voltage levels between the image signal and the reference signal may be calculated using a signal generated by the incident light. Therefore, a more accurate image signal may be generated through the image processing unit 130 at a later time.

The row decoder may apply, to the pixel array, driving signals such as a selection signal, a reset signal, and a transmission signal through row signal lines so as to select line pixels of the pixel array. The pixel array may provide, through a plurality of output lines to the ADC, pixel signals that are electrical signals sensed by respective pixels in response to the driving signals of the row decoder.

The ADC may convert the pixel signals provided from the pixel array into digital signals. The first image sensor may convert the amount of light acquired from the pixel array into pixel data through the ADC. The pixel data may be output through the correction unit 220 including image pipelines, and may be transmitted to the outside through an interface such as an MIPI, in the correction unit 220.

The first image sensor 211 and the second image sensor 212 may match the sync between each of the sensors in order to maintain the same exposure and/or timing.

Referring back to FIG. 2, the correction unit 220 may include a storage unit 221 and a correction unit 222. The storage unit 221 may store data acquired from the image sensors 210 and may be, for example, at least one of a line memory, a first-in-first-out memory, and a frame buffer.

The storage unit 221 may detect OB data values of the first image data and the second image data, respectively. That is, the storage unit 221 may detect values of the first OB data acquired from the first OB area 211A and the second OB data acquired from the second OB area 212A, respectively.

The calculation unit 222 may calculate an OB deviation based on the first OB data and the second OB data, and may perform calculation of the OB deviation of the first image data and second image data.

Referring to FIG. 4, which illustrates the calculation unit in FIG. 2, the calculation unit 222 may include at least one of a first calculation unit 401, a second calculation unit 403, a third calculation unit 405, and a driver 407. The first calculation unit 401 may be an adder that performs addition. The second calculation unit 403 may be a subtractor that performs subtraction. The third calculation unit 405 may be a multiplier that performs multiplication. The driver 407 may control the first calculation unit 401, the second calculation unit 403, and the third calculation unit 405. The components of the calculation unit 222 may vary according to the number of image sensors.

Referring back to FIG. 2, the correction unit 220 may calculate an OB deviation through the calculation unit 222. For example, the calculation unit 222 may calculate the average value of the first OB data and the average value of the second OB data, and may calculate an OB deviation by calculating the difference between the average value of the first OB data and the average value of the second OB data.

The correction unit 220 may correct the OB deviation between the first image sensor 211 and the second image sensor 212 through the first image data and the second image data. Specifically, the correction unit 220 may perform, through the calculation unit 222, calculation using the calculated OB deviation with respect to the reference image data among the first image data and the second image data. For example, the calculation unit 222 may correct the OB deviation by adding the calculated OB deviation to the second image data.

In addition, the correction unit 220 may merge the first image data and the second image data, which are acquired from the first image sensor 211 and the second image sensor 212, and may match the timing sync between the first image data and the second image data. The correction unit 220 may perform re-ordering so that the first image data and the second image data, which are synchronized and output, form a bayer pattern.

The correction unit 220 may transmit image data to the outside through an interface such as a MIPI. For example, the correction unit 220 may output, to the image processing unit 130, the first image data and second image data, for which the OB deviation is corrected.

The image processing unit 130 may receive, from the correction unit 220, the first image data and second image data, for which the OB deviation is corrected, and may process the first image data and second image data, for which the OB deviation is corrected. For example, the image processing unit 130 may exclude an OB data value from the first image data and second image data, for which the OB deviation is corrected.

Figure 5:
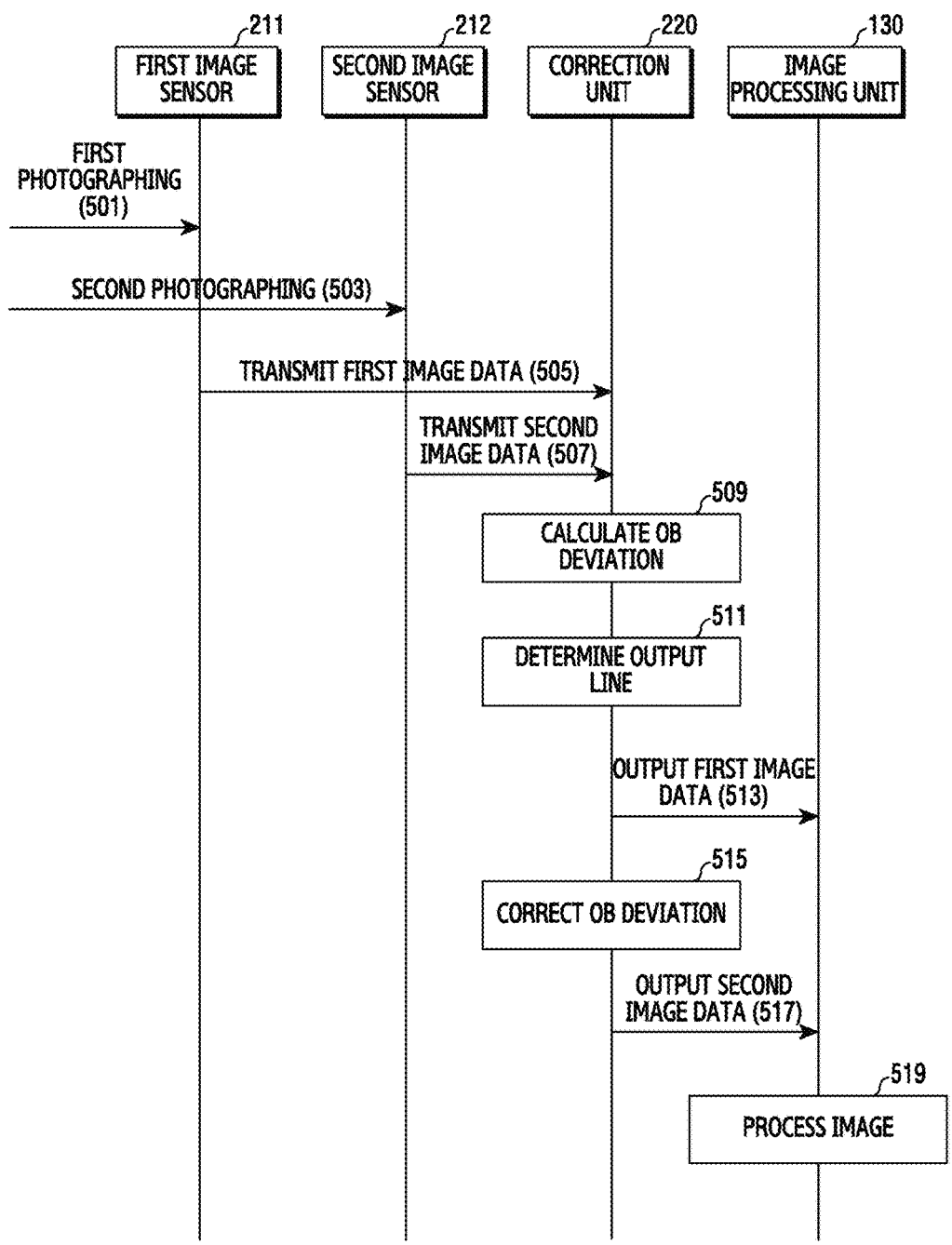
FIG. 5 illustrates a signal flow diagram in an electronic device according to embodiments of the present disclosure.

FIG. 5 illustrates a signal flow diagram in an electronic device according to embodiments of the present disclosure.

As illustrated in FIG. 5, in step 501, the first image sensor 211 may perform first photographing. The second image sensor 212 may perform second photographing, in step 503. The first photographing and the second photographing may be sequentially or concurrently performed. The first image sensor 211 and the second image sensor 212 may include OB areas that are light-shielding areas for providing a constant reference signal, respectively.

The first image sensor 211 may transmit, to the correction unit 220, first image data acquired through the first photographing, in step 505. The first image data may include the first OB data acquired from the first OB area 211A of the first image sensor 211. The second image sensor 212 may transmit, to the correction unit 220, second image data acquired through the second photographing, in step 507. The second image data may include the second OB data acquired from the second OB area 212A of the second image sensor 212.

The correction unit 220 may calculate an OB deviation, in step 509, and may detect first OB data and second OB data from the first image data and the second image data, respectively. The correction unit 220 may calculate an OB deviation based on the first OB data and the second OB data. The correction unit 220 may further have the calculation unit 222 to calculate an OB deviation. For example, the correction unit 220 may calculate, through the calculation unit 222, the average values of the first OB data and the second OB data, respectively, and calculate an OB deviation through a difference in the average values.

The correction unit 220 may determine an output line (which will be described in detail in FIG. 9 and FIG. 10) of the first image data or second image data, which is desired to be output to the image processing unit 130, in step 511. Therefore, the correction unit 220 may sequentially output, to the image processing unit 130, the first image data or the second image data according to the output line.

The correction unit 220 may output the first image data to the image processing unit 130, in step 513. Specifically, the correction unit 220 may output, in units of lines, the first image data to the image processing unit 130 according to the determined output line.

After outputting the first image data according to the determined output line, the correction unit 220 may correct the OB deviation of the second image data, in step 515. Specifically, when outputting the second image data according to the determined output line, the correction unit 220 may correct the OB deviation by performing calculation using the OB deviation, with respect to the second image data. For example, the correction unit 220 may add the calculated OB deviation to the second image data through the calculation unit 222. The first calculation unit 401 in the calculation unit 222, which performs addition may be switched to an activation mode when the second image data is output. The correction unit 220 may output, to the image processing unit 130, the second image data for which the OB deviation is corrected, in step 517. The correction unit 220 may output, in units of lines, the second image data to the image processing unit 130 according to the determined output line, in step 517.

The image processing unit 130 may process the received first image data and second image data, in step 519. For example, the image processing unit 130 may process the first image data and second image data, for which the OB deviation is corrected, and may receive and process the first image data and the second image data, which include OB data. The image processing unit 130 may exclude an OB data value from each of the first image data and the second image data, for which the OB deviation is corrected.

Figure 6:
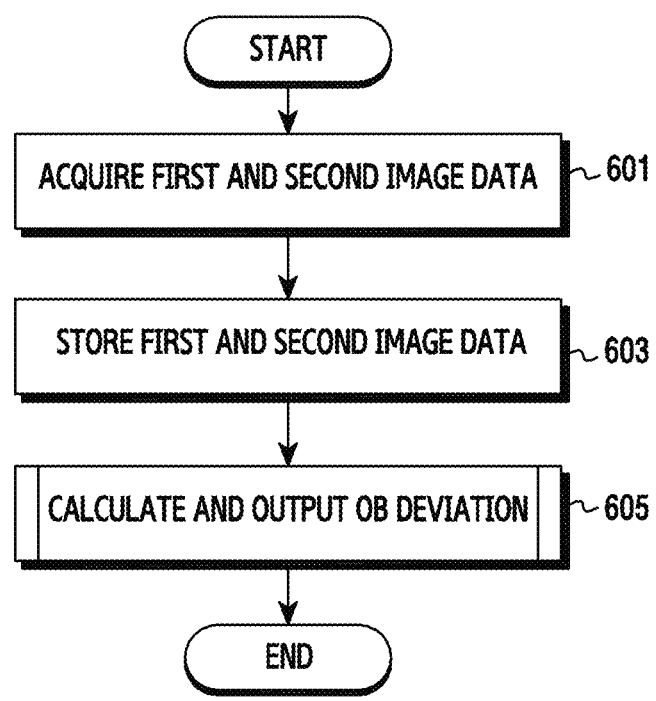
FIG. 6 illustrates a method of an electronic device according to embodiments of the present disclosure.
Figure 7:
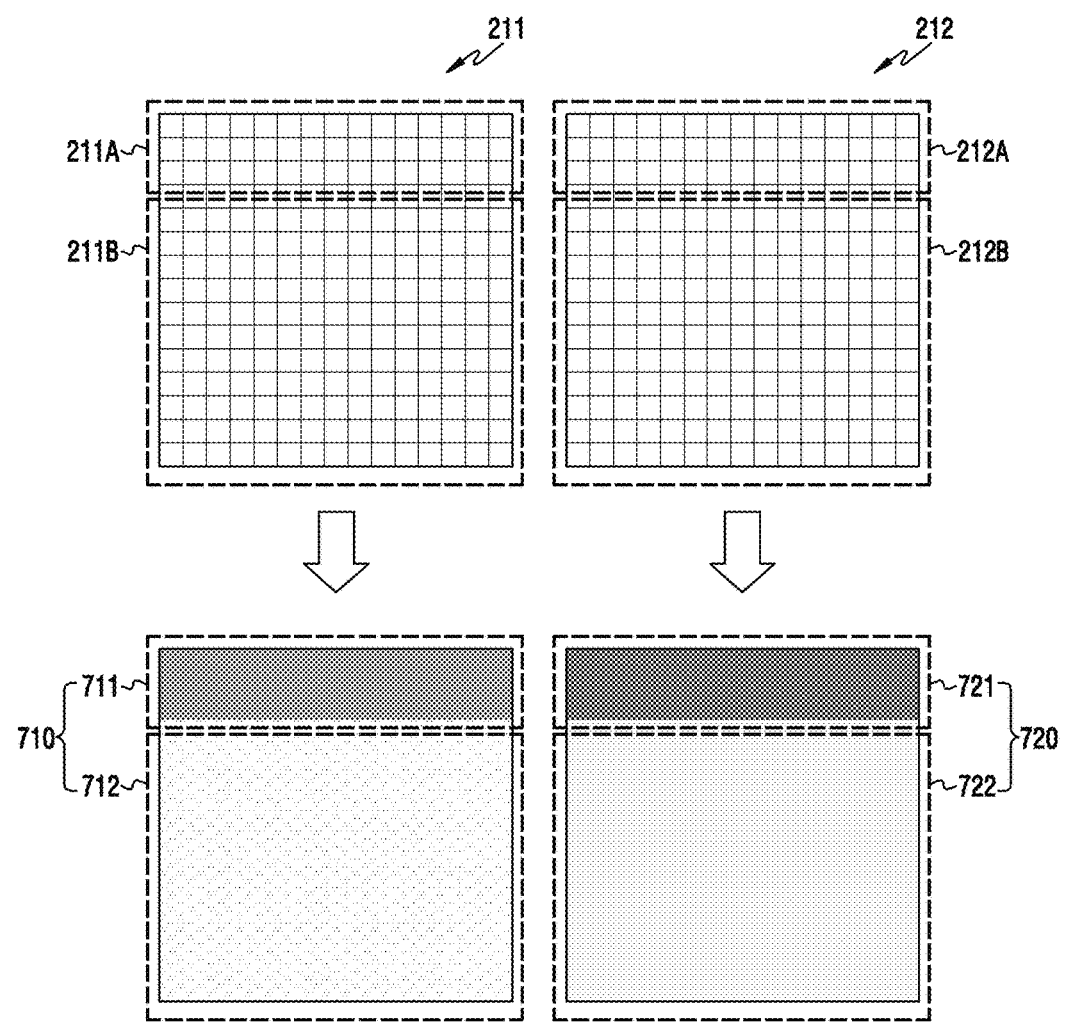
FIG. 7 illustrates a method of an electronic device according to embodiments of the present disclosure.

FIG. 6 and FIG. 7 illustrate a method of an electronic device according to embodiments of the present disclosure.

Referring to FIG. 6 and FIG. 7, the method begins by acquiring, by the correction unit 220, first image data 710 and second image data 720 through the camera unit 120, in step 601. For example, the camera unit 120 may include the first image sensor 211 and second image sensor 212 of the plurality of the image sensors 210. The first image sensor 211 may acquire the first image data 710 by performing first photographing. The second image sensor 212 may acquire the second image data 720 by performing second photographing.

As illustrated in FIG. 7, first OB data 711 may be acquired from the first OB area 211A of the first image sensor 211, and first active data 712 may be acquired from the first active area 211B of the first image sensor 211. Similarly, second OB data 721 may be acquired from the second OB area 212A of the second image sensor 212, and second active data 722 may be acquired from the second active area 212B of the second image sensor 212.

The correction unit 220 may store the first image data 710 and the second image data 720, in step 603. That is, the correction unit 220 may store, through the storage unit 221, the first image data 710 and the second image data 720, which are acquired by the first image sensor 211 and the second image sensor 212. In addition, the correction unit 220 may detect, through the storage unit 221, OB data values of the first image data 710 and the second image data 720, respectively. That is, the storage unit 221 may detect values of the first OB data 711 acquired from the first OB area 211A and the second OB data 721 acquired from the second OB area 212A, respectively.

The correction unit 220 may calculate, through the calculation unit 222, an OB deviation based on the first OB data 711 and the second OB data 721, in step 605. That is, the correction unit 220 may correct the OB deviation between the first image sensor 211 and the second image sensor 212 by calculating the OB deviation, in step 605. Specifically, the correction unit 220 may perform, through the calculation unit 222, calculation using the OB deviation with respect to the reference image data among the first image data 710 and the second image data 720, and may output, in units of lines, the first image data 710 and the second image data 720. The correction unit 220 may output, to the image processing unit, data with respect to which calculation is performed using the OB deviation, in step 605. That is, the correction unit 220 may output the first image data 710 and second image data 720, for which the OB deviation is corrected.

Figure 8:
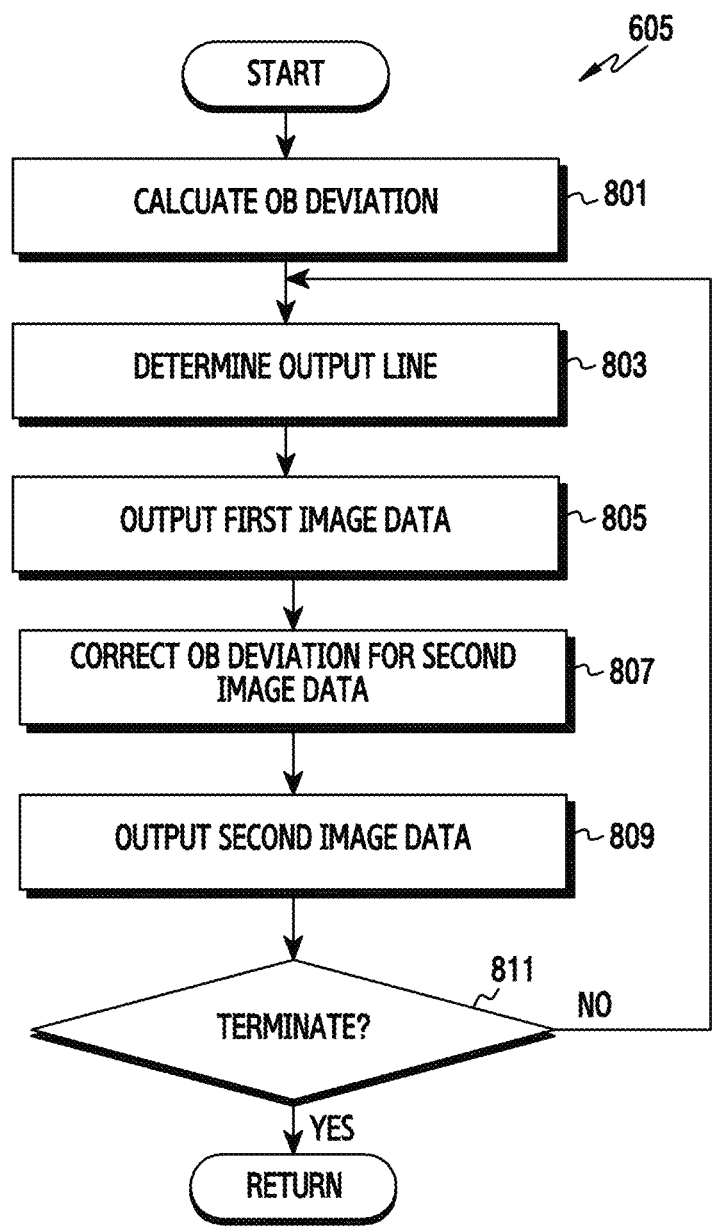
FIG. 8 illustrates calculating and outputting the OB deviation in FIG. 6.
Figure 9:
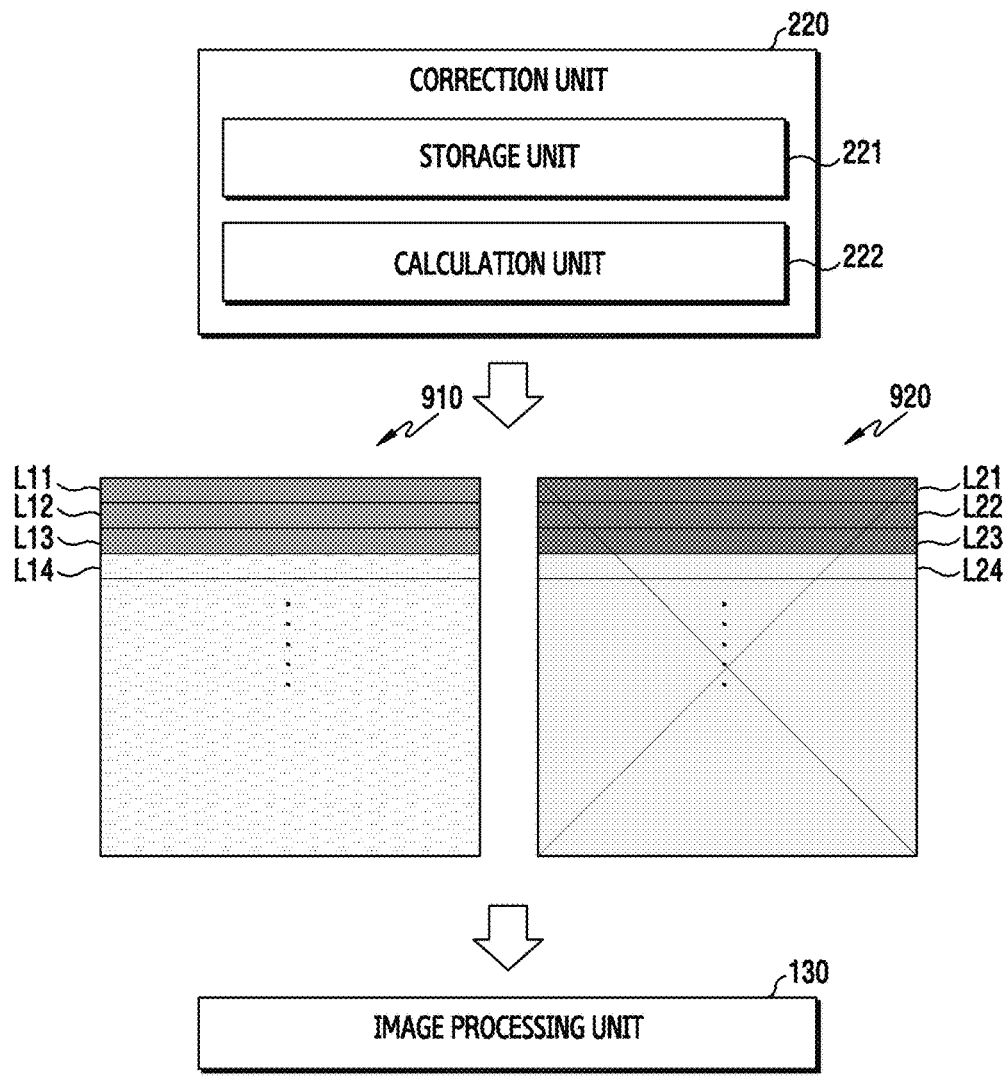
FIG. 9 and FIG. 10 illustrate a method of an electronic device according to embodiments of the present disclosure.
Figure 10:
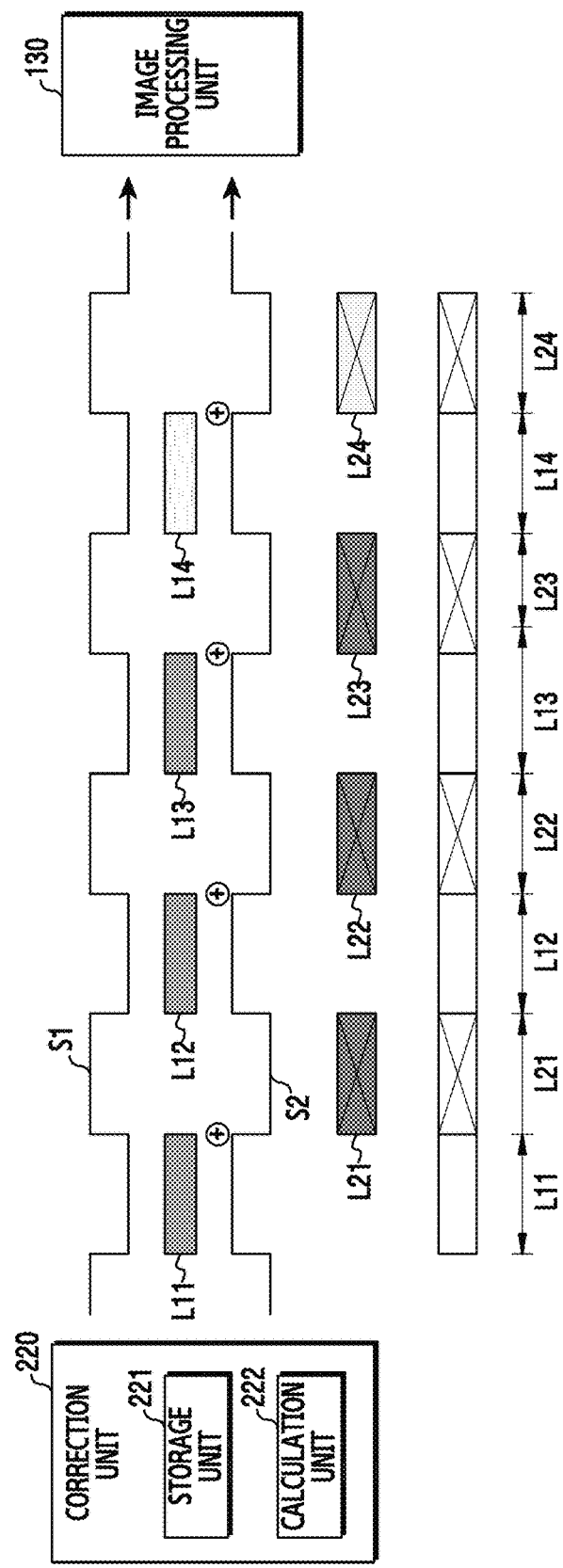

FIG. 8 illustrates calculating and outputting the OB deviation in step 605 of FIG. 6. FIG. 9 and FIG. 10 illustrate a method of an electronic device according to embodiments of the present disclosure.

By referring to FIGS. 8, 9 and 10, more detailed explanation of calculating and outputting the OB deviation in FIG. 6 is provided. In step 801, the correction unit 220 calculate an OB deviation through the calculation unit 222. For example, the calculation unit 222 may detect values of the first OB data 71 and the second OB data 721, respectively, and may calculate the average value of the first OB data 711 and the average value of the second OB data 721, and calculate a difference in the average values. The correction unit 220 may further merge the first image data 710 and the second image data 720, which are stored through the storage unit 221.

The correction unit 220 may further match the timing between the first image data 710 and the second image data 720 to perform rearrangement, in step 801. The correction unit 220 may perform re-ordering so that the first image data 710 and the second image data 720, which are synchronized and output, form a bayer pattern.

The correction unit 220 may determine an output line of first image data 910 or second image data 920, which is desired to be output to the image processing unit 130, in step 803. Therefore, the correction unit 220 may sequentially output, to the image processing unit 130, the first image data 910 or the second image data 920 according to the determined output line.

The correction unit 220 may output the first image data 910 according to the determined output line, in step 805. The correction unit 220 may output, to the image processing unit 130, the rearranged first image data 910.

As illustrated in FIG. 9 and FIG. 10, the correction unit 220 according to embodiments may output first image data L11 of a first line according to first clock signal S1 for transmitting the first image data 910. The correction unit 220 may also output second image data L21 of the first line according to second clock signal S2 for transmitting the second image data 920. The first clock signal S1 and the second clock signal S2 have first value and second value less than the first value. Period having a first value in the first clock signal S1 is defined as "high", and period having the second value in the first clock signals is defined as "low", hereinafter.

For example, the correction unit 220 may output, to the image processing unit 130, the first image data L11 of the first line when the first clock signal S1 is low. When the output of the first image data L11 of the first line is completed, the correction unit 220 may correct, through the calculation unit 222, the OB deviation for the second image data L21 of the first line, in step 807. The control unit 160 may switch the calculation unit 222 to an activation mode in order to correct the OB deviation. For example, the calculation unit 222 has been in a deactivation mode when the first image data 910 is output, and may be switched to an activation mode only when the second image data 920 is output.

Therefore, the correction unit 220 may correct the OB deviation for the second image data L21 of the first line, through the calculation unit 222. That is, the calculation unit 222 may perform calculation, in units of lines, using the OB deviation calculated in step 801, with respect to the second image data 720. That is, the calculation unit 222 may perform calculation using the OB deviation, in units of lines, with respect to the rearranged second image data 920. For example, the calculation unit 222 may add a value of the calculated OB deviation to a value of the rearranged second image data L21 of the first line. In embodiments, only the calculation unit necessary for OB deviation correction in the calculation unit 222 may be switched to an activation mode. For example, when the second image data 920 is output, only the first calculation unit 401 is switched to an activation mode so as to perform addition to the second image data 920.

The correction unit 220 may output the second image data 920 in units of lines, in step 809. The correction unit 220 may output, to the image processing unit 130, the second image data L21 of the first line, with respect to which calculation is performed using the OB deviation in the rearranged second image data 920.

For example, the correction unit 220 may calculate, through the calculation unit 222, the second image data L21 of the first line according to second clock signal S2 for transmitting the second image data 920, and then output the second image data L21. The calculation unit 222 may be activated to calculate the second image data 920 when the second clock signal S2 is low. That is, the calculation unit 222 may add a value of the calculated OB deviation to a value of the second image data L21 of the first line when the second clock signal S2 is low. In addition, the storage unit 221 may output the second data L21 of the first line, with respect to which calculation is performed using the OB deviation, when the second clock signal S2 is low.

In the present disclosure, it is described that calculation is performed using the OB deviation with respect to the second image data 920 so as to output the second image data 920 to the image processing unit 130, but the present disclosure is not limited thereto. According to embodiments, the storage unit 221 may perform calculation using the OB deviation with respect to a value of the first image data 910 so as to output the first image data 910 to the image processing unit 130. For example, the storage unit 221 may add, through the calculation unit 222, the calculated OB deviation to a value of the first image data 910 so as to output the first image data 910. The calculation unit 222 may be switched to an activation mode when the first image data is output 910, and may be switched to a deactivation mode when the second image data 920 is output.

According to embodiments, calculation may be performed using the OB deviation with respect to both the first image data 910 and the second image data 920, so as to output the first and second image data 910 and 920 to the image processing unit 130. The calculation unit 222 may be continuously in an activation mode when the first image data 910 and the second image data 920 are output.

In step 811, the control unit 160 may determine whether to terminate the output of the first image data 910 or the second image data 920. When it is determined that the output of both the first image data 910 and the second image data 920 is completed, the control unit 160 may terminate the output. When it is determined that the output of both the first image data 910 and the second image data 920 has not been completed, the control unit 160 may return to step 803.

When it is determined that the output has not been fully completed, the correction unit 220 may determine an output line of the first image data 910 or the second image data 920, which is desired to be output to the image processing unit 130, in step 803. For example, when it is determined that the output of the second image data L21 of the first line is completed, the control unit 160 may determine to output the first image data L12 of the second line.

The correction unit 220 may output the first image data 910 according to the determined output line, in step 805. That is, when it is determined to output the first image data L12 of the second line, the correction unit 220 may output the first image data L12 of the second line, in step 805. The correction unit 220 may output the first image data L12 of the second line according to the first clock signal S1 for transmitting the first image data 910. The correction unit 220 may output, to the image processing unit 130, the rearranged first image data L12 of the second line when the first clock signal S1 is low.

When the output of the first image data L12 of the second line is completed, the correction unit 220 may correct the OB deviation for the second image data L22 of the second line through the calculation unit 222, in step 807. That is, the calculation unit 222 may perform calculation using the OB deviation calculated in step 801, with respect to the rearranged second image data L22 of the second line. For example, the calculation unit 222 may add a value of the calculated OB deviation to a value of the rearranged second image data L22 of the second line.

The correction unit 220 may output the second image data 920 in units of lines, in step 809. The correction unit 220 may output, to the image processing unit 130, the second image data L22 of the second line, with respect to which calculation is performed using the OB deviation in the rearranged second image data L22 of the second line.

For example, the correction unit 220 may calculate, through the calculation unit 222, the second image data L22 of the second line according to the second clock signal S2 for transmitting the second image data 920, and then output the second image data L22. The second clock signal S2 is assumed to be in an enable state when S2 is high. The calculation unit 222 may be activated to calculate the second image data 920 when the second clock signal S2 is low. That is, when the second clock signal S2 is low, the calculation unit 222 may add a value of the calculated OB deviation to a value of the second image data L22 of the second line. In addition, the storage unit 221 may output the second image data L22 of the second line, with respect to which calculation is performed using the OB deviation when the second clock signal S2 is low.

The correction unit 220 may output, to the image processing unit 130, first image data L13 of third line and second image data L23 of third line, in similar operations to the output in steps 805 and 809. In addition, the control unit 160 may output, to the image processing unit 130, first image data L14 of fourth line and second image data L24 of fourth line, in a similar operations to the output in steps 805 and 809.

The correction unit 220 may output, to the image processing unit 130, all lines of the first image data 910 and second image data 920, and may determine whether all lines of the first image data 910 and second image data 920 have been output, so as to determine whether to terminate the output, in step 811. In step 811, when it is determined that all lines of the first image data 910 and second image data 920 have not been output, the correction unit 220 may return to step 803. When it is determined that all lines of the first image data 710 and second image data 720 have been output, the correction unit 220 may terminate step 605 of FIG. 6, in step 811.

In embodiments, one image processing unit 130 may process image data acquired from the plurality of image sensors 210, and the OB deviation between each of the image sensors 210 is efficiently corrected. In addition, the reliability of the corrected image data is enhanced.

In embodiments, when an OB deviation is corrected by acquiring image data through a plurality of the image sensors 210, the camera unit 120 may be miniaturized through the addition of a minimum amount of hardware. In addition, OB deviation correction may be performed through calculation using the OB deviation at the least calculation.

In embodiments, it is possible to use a conventional image processing unit without changing the structure or design of the unit.

The programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added. Embodiments disclosed herein are provided merely to easily describe technical details of the present disclosure and to assist in the understanding of the present disclosure, and are not intended to limit the scope of the present disclosure. Accordingly, the scope of the present disclosure should be construed as including all modifications or various other embodiments based on the technical idea of the present disclosure.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of an electronic device, comprising:
   acquiring image data from a plurality of image sensors including optical black (OB) areas that are light-shielding areas for providing a reference signal, wherein the plurality of image sensors comprises a first image sensor that acquires first image data and a second image sensor that acquires second image data, the first image data including first OB data and first active data and the second image data including second OB data and second active data;
   calculating an OB deviation through the first OB data and the second OB data,
   correcting the OB deviation for at least one piece of the image data; and
   outputting, to an image processing circuit, the image data for which the OB deviation is corrected.

2. The method of claim 1, wherein the OB deviation is a difference in an average value of the first OB data and the average value of the second OB data.

3. The method of claim 1, wherein the calculated OB deviation is corrected for at least one of the first image data and the second image data.

4. The method of claim 1, wherein correcting the OB deviation comprises adding the calculated OB deviation to at least one of the first image data and the second image data.

5. The method of claim 1, wherein correcting the OB deviation comprises correcting the OB deviation when the second image data is output to the image processing circuit.

6. The method of claim 1, wherein outputting the image data comprises:
   outputting the first image data to the image processing circuit; and
   correcting the OB deviation for the second image data so as to output the second image data to the image processing circuit.

7. The method of claim 1, wherein outputting the image data comprises determining an output line of the image data and outputting, in units of lines, the image data for which the OB deviation is corrected.

8. The method of claim 1, wherein correcting the OB deviation for at least one piece of the image data comprises correcting the OB deviation for at least one of the first image data and the second image data.

9. An electronic device comprising:
   a plurality of image sensors configured to include optical black (OB) areas that are light-shielding areas for providing a reference signal;
   a correction circuit;
   an image processing circuit; and
   a control circuit operably coupled with and controlling the image sensors, the correction circuit, and the image processing circuit, and configured to:
   acquire image data from the plurality of image sensors, wherein the plurality of image sensors comprises a first image sensor that acquires first image data and a second image sensor that acquires second image data, the first image data including first OB data and first active data, and the second image data including second OB data and second active data,
   calculate an OB deviation through the first OB data and the second OB data,
   correct the OB deviation for at least one piece of the image data, and
   output, to the image processing circuit, the image data for which the OB deviation is corrected.

10. The electronic device of claim 9, wherein the OB deviation is a difference in an average value of the first OB data and the average value of the second OB data.

11. The electronic device of claim 9, wherein the control circuit is configured to correct the calculated OB deviation for at least one of the first image data and the second image data through the correction circuit.

12. The electronic device of claim 9, wherein the control circuit is further configured to add the calculated OB deviation to at least one of the first image data and the second image data through the correction circuit.

13. The electronic device of claim 9, wherein the control circuit is further configured to correct the OB deviation for the at least one piece of the image data when the second image data is output to the image processing circuit.

14. The electronic device of claim 9, wherein the control circuit is further configured to:

output the first image data to the image processing circuit, and correct the OB deviation for the second image data so as to output the second image data to the image processing circuit.

15. The electronic device of claim 9, wherein control circuit is further configured to:

determine an output line of the image data and output, in units of lines, the image data for which the OB deviation is corrected.

16. The electronic device of claim 9, wherein the control circuit is further configured to correct the OB deviation for at least one of the first image data and the second image data.

* * * * *